US010451707B1

(12) United States Patent
Castaldi et al.

(10) Patent No.: US 10,451,707 B1
(45) Date of Patent: Oct. 22, 2019

(54) MILLIMETER WAVE HAND TRACKING

(71) Applicant: Facebook Technologies, LLC, Menlo Park, CA (US)

(72) Inventors: Giuseppe Castaldi, Apice (IT); Andrea Cusano, Caserta (IT); Vincenzo Galdi, Benevento (IT); Paolo Mattera, Benevento (IT); Roberto Parente, Cerreto Sannita (IT); Joseph Minh Tien, Redmond, WA (US); Dustin Jeffery Gordon Krogstad, Chino, CA (US); Riccardo DeSalvo, Pasadena, CA (US); Yi Zhao, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 17 days.

(21) Appl. No.: 15/874,761

(22) Filed: Jan. 18, 2018

(51) Int. Cl.
*G01S 5/02* (2010.01)
*G06F 3/01* (2006.01)

(52) U.S. Cl.
CPC .......... *G01S 5/0226* (2013.01); *G01S 5/0289* (2013.01); *G06F 3/014* (2013.01)

(58) Field of Classification Search
CPC ....... G01S 5/0289; G01S 5/0226; G06F 3/014
See application file for complete search history.

(56) References Cited

U.S. PATENT DOCUMENTS

| | | | | |
|---|---|---|---|---|
| 8,035,550 B2* | 10/2011 | Holly | .................. | F41H 13/0075 342/128 |
| 2006/0025897 A1* | 2/2006 | Shostak | ................ | B60C 23/005 701/1 |
| 2017/0168586 A1* | 6/2017 | Sinha | ....................... | G06F 3/017 |
| 2017/0173262 A1* | 6/2017 | Veltz | .................... | A61M 5/1723 |
| 2018/0015327 A1* | 1/2018 | Lee | .................... | A63B 24/0006 |

* cited by examiner

*Primary Examiner* — Dmitriy Bolotin
(74) *Attorney, Agent, or Firm* — Fenwick & West LLP

(57) ABSTRACT

A system includes a locatable glove and a pose determination device. The locatable glove includes a glove body worn over a hand of a user, and a plurality of positioning transponders. The positioning transponders are coupled to the glove body at various positions on the glove body, and each re-radiates a received signal, the re-radiated signal unique to the positioning transponder. The pose determination device includes a plurality of antennas and a controller. The antennas are each configured to receive the unique signals re-radiated by the positioning transponders. The antennas are physically separated from each other. The controller is communicatively coupled to the plurality of antennas, and is configured to determine, for each of the received unique signals, a location of the position on the locatable glove of the positioning transponder corresponding to the unique signal.

20 Claims, 5 Drawing Sheets

MILLIMETER WAVE HAND TRACKING

BACKGROUND

The present disclosure generally relates to hand tracking, and specifically relates to tracking the position of a hand using a glove equipped with millimeter-wave transponders.

Hand tracking refers to the process of determining the location or position of a user's hand. Hand tracking for virtual reality and/or augmented reality applications is emerging as an important feature. Current hand-tracking systems rely in inertial motion tracking or optical motion capture. Inertial motion tracking involves placing inertial sensors on a glove, and using the inertial sensors to track rotations and determine hand movement or pose. Inertial motion tracking does not capture the position of the hand in space and may drift over time, and materials in the environment can interfere with the function of the inertial sensors. Optical motion capture involves tracking using one or more cameras to capture images of the hand, and determining the position and pose of the hand from the images. In some cases, the user wears a glove with markers that are tracked. Optical motion capture requires the markers on the user's hand to be in the line of sight of the camera. Further, markers that are not visually distinct from each other can lead to inaccurate hand tracking, especially if a small proportion of the markers is visible to the camera.

SUMMARY

A system for tracking the position and movement of a locatable garment worn by a user is disclosed herein. For example, the locatable garment may be a glove that is worn by the user and used to track a user's hand. The system includes a pose determination device, external to the locatable garment, to determine the position of the garment, which corresponds to the position of a body part (e.g., a hand) inside the locatable garment (e.g., a glove). The locatable garment includes multiple positioning transponders, such as millimeter-wave transponders, located in different positions on the locatable garment. The pose determination device includes multiple antennas. At least one of the antennas interrogates the locatable garment's positioning transponders, which re-radiate signals received from the interrogating antenna. Based on the signals re-radiated from the positioning transponders and received at the multiple antennas, the pose determination device can triangulate a position of each of the positioning transponders. Each positioning transponder has at least one unique transmission characteristic, such as a frequency band, a phase state, a modulated code, or a time at which the antenna re-radiates, which allow the pose determination device to distinguish the individual positioning transponders. Based on the determined location of each positioning transponder, the pose determination device can determine the position of the locatable garment, which corresponds to the position of the user's body or body part. As used herein, the position of a locatable garment can include one or more of the position of the glove in space (e.g., relative to the location of another device worn by the user, such as an HMD including a pose determination device, and/or relative to the location of a device at a fixed location and in the vicinity of the locatable garment, such as a console including a pose determination device), the pose of the body or body part (based on the positions of points on the locatable garment relative to each other), and the orientation of the body part (e.g., relative to another part of the user's body, or relative to a fixed location in the vicinity of the locatable garment).

In some embodiments, a system including a locatable glove and a pose determination device is described herein. The locatable glove includes a glove body that can be worn over a hand of a user. A plurality of positioning transponders are coupled to the glove body at a corresponding plurality of positions on the glove body. Each positioning transponder is configured to re-radiate a received signal, the re-radiated signal being unique to the positioning transponder. The pose determination device includes a plurality of antennas and a controller communicatively coupled to the plurality of antennas. The antennas are physically separated from each other, and they are each configured to receive the unique signals re-radiated by the plurality of positioning transponders. The controller is configured to determine, for each of the received unique signals, a location of the position on the locatable glove of the positioning transponder corresponding to the unique signal.

In some embodiments, a locatable glove is described herein. The locatable glove includes a glove body configured to be worn over at least a portion of a hand of a user, and a plurality of transponders coupled to the glove body at a corresponding plurality of positions on the glove body. Each transponder is configured to re-radiate a received signal, the re-radiated signal unique to the transponder and in a millimeter-wave band. The locatable glove also includes a controller that is communicatively coupled to the plurality of transponders. The controller is configured to control emission of the plurality of transponders.

In some embodiments, a pose determination device is disclosed herein. The pose determination device includes a plurality of antennas and a controller communicatively coupled to the antennas. The antennas are physically separated from each other on the pose determination device. Each antenna is configured to receive a plurality of signals corresponding to a plurality of unique signals re-radiated by a corresponding plurality of positioning transponders on a locatable glove. The controller receives, from each antenna, the plurality of signals received by the antenna. The controller identifies, for each positioning transponder of the plurality of positioning transponders, a set of received signals corresponding to the positioning transponder based on a characteristic of the signals in the set of received signals. Each received signal in the set was received by a corresponding one of the plurality of antennas. The controller determines, for each positioning transponder of the plurality of positioning transponders, a location of the position on the locatable glove of the positioning transponder. Based on the determined locations, the controller determines a position of the locatable glove.

Figure 1:
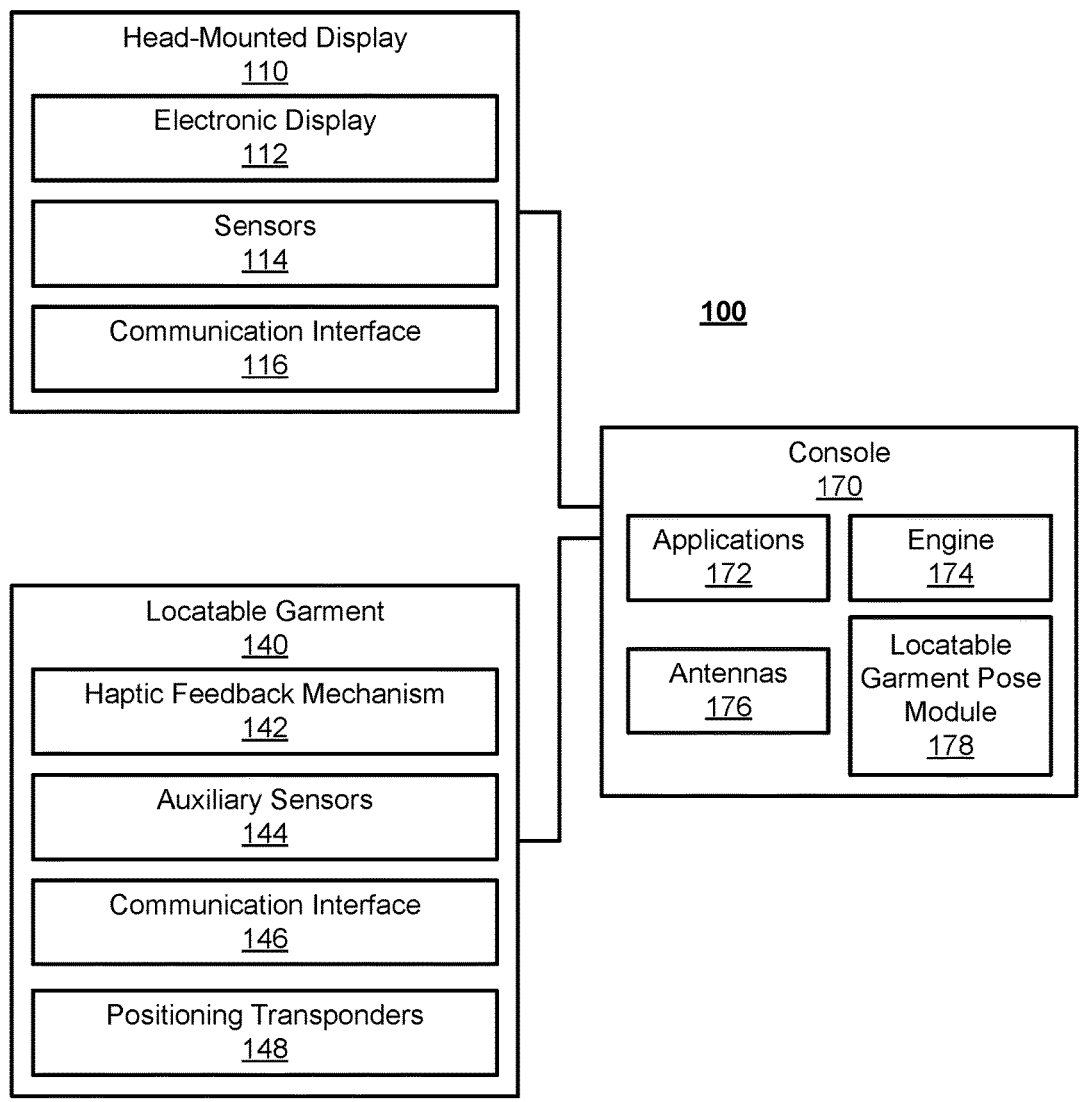
FIG. 1 is a block diagram of a system environment, in accordance with an embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

In artificial reality systems, hand tracking and gesture recognition can be used for user input. For example, the artificial reality system can recognize known gestures and respond accordingly. If a haptic glove is used, the artificial reality system can also provide haptic feedback to the user. For example, if a user makes a gesture that corresponds to picking up an object, a haptic tracking glove can track the user's motion, such as reaching and grasping, and provide tactile feedback so that the user senses an object is in his hand. As described herein, the artificial reality system can use signals re-radiated by transponders on a locatable glove, such as a haptic glove, to determine the location of the glove. The re-radiated signals may differ in at least one characteristic, so that the artificial reality system can identify the signals from each individual positioning transponder and determine each individual positioning transponder's position. This allows more accurate determination of a hand position compared to prior techniques. The transponders may re-radiate signals in a millimeter-wave band. The extremely high frequency (EHF) band, as designated by the International Telecommunication Union (ITU) encompasses frequencies from 30 GHz through 300 GHz, and wavelengths between 1 mm and 1 cm. Radio waves in or near this band are commonly referred to as millimeter-waves, or as being in the millimeter-wave band. In some embodiments, the antennas may emit and receive waves having wavelengths outside the EHF band, such as any wavelength or band in the ultra high frequency (UHF) band (1 meter to 1 decimeter), super high frequency (SHF) band (1 dm to 1 cm), or terahertz band (100 µm to 1 mm). In some embodiments, the signals may be received even if the positioning transponders are not in the direct line of sight of an interrogating antenna, e.g., through a garment or through fabric of the glove. At some wavelengths, the signals may able travel though objects or though the user's body, e.g., through the user's hand.

FIG. 1 is a block diagram of a system environment 100 in which a locatable garment 140 operates. The system environment 100 may be, for example, an artificial reality system. In some embodiments, the system environment 100 is capable of alternating between operating as a VR, an MR, and an AR system, or some subset thereof. The system environment 100 shown in FIG. 1 comprises a head-mounted display (HMD) 110 and a locatable garment 140 that are both coupled to a console 170. While FIG. 1 shows an example system environment 100 including one HMD 110 and one locatable garment 140, in other embodiments any number of these components may be included in the system environment 100. For example, the system environment 100 may include two locatable garments 140 (e.g., one glove for each hand) that are worn by the same user. As another example, the system environment 100 may include multiple locatable garments 140 intended to be worn by multiple users, with each locatable garment 140 or each pair of locatable garments 140 associated with a different HMD 110. In alternative configurations, different or additional components may be included in the system environment 100.

The HMD 110 is a head-mounted display that presents media to a user. Examples of media presented by the HMD 110 include images, video, audio, or some combination thereof. In some embodiments, audio is presented via an external device (e.g., speakers or headphones) that receives audio information from the HMD 110, the console 170, or both, and presents audio data based on the audio information. In some embodiments, the HMD 110 may also act as an AR and/or MR headset. In these embodiments, the HMD 110 augments views of a physical, real-world environment with computer-generated elements (e.g., images, video, sound, etc.).

The HMD 110 includes an electronic display 112, sensors 114, and a communication interface 116. Some embodiments of the HMD 110 have different components than those described here. Similarly, the functions can be distributed among the components in a different manner than is described here.

The electronic display 112 displays images to the user in accordance with data received from the console 170. In various embodiments, the electronic display 112 may comprise a single electronic display 112 or multiple electronic displays 112 (e.g., one display for each eye of a user).

The sensors 114 include one or more hardware devices that detect spatial and motion information about the HMD 110. Spatial and motion information can include information about the position, orientation, velocity, rotation, and acceleration of the HMD 110. For example, the sensors 114 may include a gyroscope that detects rotation of the user's head while the user is wearing the HMD 110. This rotation information can then be used (e.g., by the engine 174) to adjust the images displayed on the electronic display 112.

The communication interface 116 enables input and output to the console 170. In some embodiments, the communication interface 116 is a bus, such as High-Definition Multimedia Interface (HDMI), Universal Serial Bus (USB), Video Graphics Array (VGA), Digital Visual Interface (DVI), DisplayPort™, or some combination thereof. In other embodiments, the communication interface 116 includes several distinct communication buses operating together or independently. In one embodiment, the communication interface 116 includes wireless connections for sending data collected by the sensors 114 from the HMD 110 to the console 170 but also includes a wired connection (e.g., an HDMI or DVI connection) that receives audio/visual data to be rendered on the electronic display 112.

The locatable garment 140 is a trackable wearable device. The locatable garment 140 may be configured to be worn on a portion of a user's body, such as the user's hand (e.g., a glove). In other embodiments, the locatable garment 140 is configured to be worn on another part of the user's body, such as an arm, a leg, or a foot, or worn on multiple parts of the user's body, such as a shirt, pants, or body suit. The locatable garment 140 may collect information about the portion of the user's body that can be used as input for virtual reality applications 172 executing on the console 170. The locatable garment 140 includes a haptic feedback mechanism 142, auxiliary sensors 144, a communication interface 146, and positioning transponders 148. Some embodiments of the locatable garment 140 have different components than those described here, e.g., the locatable garment 140 may include additional components that are not shown in FIG. 1, such as a power source (e.g., an integrated battery, a connection to an external power source, or some combination thereof) and one or more controllers (e.g., for controlling the positioning transponders). Similarly, the functions can be distributed among the components in a different manner than is described here.

The haptic feedback mechanism 142 provides haptic feedback to the user by directing the portion of the user's body to move in a particular way or in a particular direction or preventing the portion of the user's body from moving in certain directions or in certain ways. The haptic feedback mechanism 142 may include actuators for applying forces on portions of the user's body. By applying forces to the user's body, the haptic feedback mechanism 142 may move a portion of the user's body apply torque to a joint of a user's body, or produce tactile sensation for the user.

The auxiliary sensors 144 include one or more hardware devices that detect spatial information for the locatable garment 140. Examples of auxiliary sensors 144 include: one or more accelerometers, one or more gyroscopes, one or more magnetometers, another suitable type of sensor that detects motion, a type of sensor used for error correction, or some combination thereof. The auxiliary sensors 144 may provide data to an inertial measurement unit (IMU), which is an electronic device that generates data indicating a position of the locatable garment 140 based on measurement signals received from one or more of the auxiliary sensors 144. The auxiliary sensors 144 may be located external to the IMU, internal to the IMU, or some combination thereof.

The spatial information detected by the auxiliary sensors 144 and/or IMU may include information about position, orientation, velocity, rotation, and acceleration, or some combination thereof. The spatial information may refer to the entire locatable garment 140, subdivisions of the locatable garment 140, or both. For example, if the locatable garment 140 is a haptic glove, auxiliary sensors 144 may identify positions and orientations of various portions of the glove, such as glove digits or portions of the glove digits corresponding to a wearer's fingertips or knuckles. The auxiliary sensors 144 may also detect forces applied by the user to the locatable garment 140. The spatial information may supplement position information determined using the positioning transponders 148.

The communication interface 146 enables input from and output to the console 170 and/or HMD 110. In some embodiments, the communication interface 146 may be a single communication bus, such as USB. In other embodiments, the communication interface 146 includes several distinct communication buses operating together or independently. For example, the communication interface 146 may include separate communication buses for receiving control signals for the haptic feedback mechanism 142 and sending data from the auxiliary sensors 144 to the console 170 or HMD 110. The one or more communication buses of the communication interface 146 may be implemented as wired connections, wireless connections, or some combination thereof.

The positioning transponders 148 are transponders that receive re-radiate signals that can be used to track the locatable garment 140. For example, the positioning transponders 148 may re-radiate signals in the millimeter-wave band. The positioning transponders 148 may each include a receiving antenna and a transmitting antenna. The positioning transponders 148 may be active, passive, semi-active, or semi-passive transponders. The positioning transponders 148 may be located at known locations on the locatable garment 140; for example, if the locatable garment 140 is a glove, it may have positioning transponders 148 near the fingertips, at on one or more locations along each finger (e.g., on or near one or more knuckles), at one or more locations on the palm of the glove, and at one or more locations on the back of the glove. Each positioning transponder 148 may re-radiate a unique signal so that each positioning transponder 148 can be uniquely identified.

The console 170 is a computing device that executes artificial reality applications. For example, the console 170 processes input data from the sensors 114 on the HMD 110 and the positioning transponders 148 on the locatable garment 140 and, based on the input, provides output data for the electronic display 112 on the HMD 110 and the haptic feedback mechanism 142 on the locatable garment 140. In some embodiments, the console 170 also processes input data from the auxiliary sensors 144 on the locatable garment 140. The console 170, or portions thereof, may be integrated with the HMD 110, the locatable garment 140, or both the HMD 110 and the locatable garment 140. For example, in some embodiments, the HMD 110 includes the console 170 in its entirety. The console 170 can be implemented as any kind of computing device, such as an integrated system-on-a-chip, a microcontroller, a desktop or laptop computer, a server computer, part of a HMD, a tablet, a smart phone, or other mobile device. Thus, the console 170 may include components common to typical computing devices, such as a processor, random access memory (RAM), a storage device, a network interface, an I/O interface, and the like.

The processor may be or include one or more graphics processing units (GPUs), microprocessors, or application specific integrated circuits (ASICs). The memory may be or include RAM, ROM, DRAM, SRAM, and MRAM, and may include firmware, such as static data or fixed instructions, BIOS, system functions, configuration data, and other routines used during the operation of the computing device and the processor. The memory also provides a storage area for data and instructions associated with applications and data handled by the processor.

The storage device provides non-volatile, bulk, or long term storage of data or instructions in the computing device. The storage device may take the form of a magnetic or solid state disk, tape, CD, DVD, or other reasonably high capacity addressable or serial storage medium. Multiple storage devices may be provided or be available to the computing device. Some of these storage devices may be external to the computing device, such as network storage or cloud-based storage. The network interface includes an interface to a network and can be implemented as either a wired or wireless interface. The I/O interface interfaces the processor to peripherals (not shown) such as, depending upon the computing device, sensors, displays, cameras, color sensors, microphones, keyboards and USB devices.

In the example shown in FIG. 1, the console 170 further includes applications 172, an engine 174, antennas 176, and a locatable garment pose module 178. An application 172 running on the engine 174 may generate an artificial reality environment. In some embodiments, the applications 172, the engine 174, and the locatable garment pose module 178 are implemented as software modules that are stored on the storage device and executed by the processor. Some embodiments of the console 170 include additional or different components than those described in conjunction with FIG. 1. Similarly, the functions further described below may be distributed among components of the console 170 in a different manner than is described here.

Each application 172 is a group of instructions that, when executed by a processor, generates virtual reality content for presentation to the user. An application 172 may generate content (e.g., artificial reality content) in response to inputs received from the user via movement of the HMD 110 or the locatable garment 140. Examples of applications 172 include gaming applications, conferencing applications, video playback applications, augmented reality application, telerobotic applications, or other suitable applications.

The antennas 176 transmit signals to the positioning transponders 148 on the locatable garment 140 and receive signals transmitted by the positioning transponders 148. For example, the antennas 176 may be radar antennas that interrogate the positioning transponders 148, which re-radiate the interrogation signals transmitted by the antennas 176. The antennas 176 receive the re-radiated signals, which can identify the positioning transponder from which they came and provide a ranging measurement. The antennas 176 may be configured to emit and detect electromagnetic radiation in the frequency band of the positioning transponders 148, e.g., the millimeter-wave band. In some embodiments, each antenna 176 may include a transmitting antenna and a separate receiving antenna. In some embodiments, each antenna 176 is an antenna array, or a single antenna array is used. The antennas 176 may be distributed at different locations on the console 170 so that the signals they receive differ based on the antennas' locations, which allows triangulation or trilateration of the positioning transponders' positions. In some embodiments, one or more antennas 176 are housed separately from the console 170 and are in wireless or wired communication with the console 170. In some embodiments, some or all of the antennas 176 are integrated into the HMD 110.

The antennas 176 transmit the received signals to the locatable garment pose module 178, which processes the signals. In some embodiments, each positioning transponder 148 re-radiates a signal with a unique characteristic, and the locatable garment pose module 178 identifies the signals received by the antennas 176 from each positioning transponder 148. The locatable garment pose module 178 determines a range to each positioning transponder. If the antennas 176 are distributed at different locations within the console 170, or different locations outside the console 170 (e.g., at different locations on the HMD 110), the locatable garment pose module 178 can triangulate the position of each positioning transponder 148 based on the range measurements. Based on the positions of the positioning transponders 148, the locatable garment pose module 178 can determine the overall position (including one or more of location, orientation, and pose) of the locatable garment 140. In embodiments in which the antennas 176 are integrated into the HMD 110, the locatable garment pose module 178 may also be integrated into the HMD.

The engine 174 is a software module that allows the applications 172 to operate in conjunction with the HMD 110 and the locatable garment 140. In some embodiments, the engine 174 receives information from sensors 114 on the HMD 110 and provides the information to an application 172. Based on the received information, the engine 174 determines media content to provide to the HMD 110 for presentation to the user via the electronic display 112 or haptic feedback to provide to the locatable garment 140 to provide to the user via the haptic feedback mechanism. For example, if the engine 174 receives information from the sensors 114 on the HMD 110 indicating that the user has looked to the left, the engine 174 generates content for the HMD 110 that mirrors the user's movement in a virtual environment.

In some embodiments, the engine 174 receives position information from the locatable garment pose module 178 and/or the auxiliary sensors 144 and provides the information to an application 172. The application 172 can use the information to perform an action within the virtual world of the application 172. For example, if the engine 174 receives information from the locatable garment pose module 178 that the user has closed her fingers around a position corresponding to a virtual coffee mug in a virtual environment and raised her hand, a simulated hand in the application 172 picks up the virtual coffee mug and lifts it to a corresponding height.

The engine 174 may also provide feedback to the user that the action was performed. The provided feedback may be visual via the electronic display 112 in the HMD 110 (e.g., displaying the simulated hand as it picks up and lifts the virtual coffee mug) or haptic feedback via the haptic feedback mechanism 142 in the locatable garment 140 (e.g., resisting movement of a user's fingers from curling past a certain point to simulate the sensation of touching a solid coffee mug). The haptic feedback may also be force feedback from some machine being controlled by the user.

Figure 2:
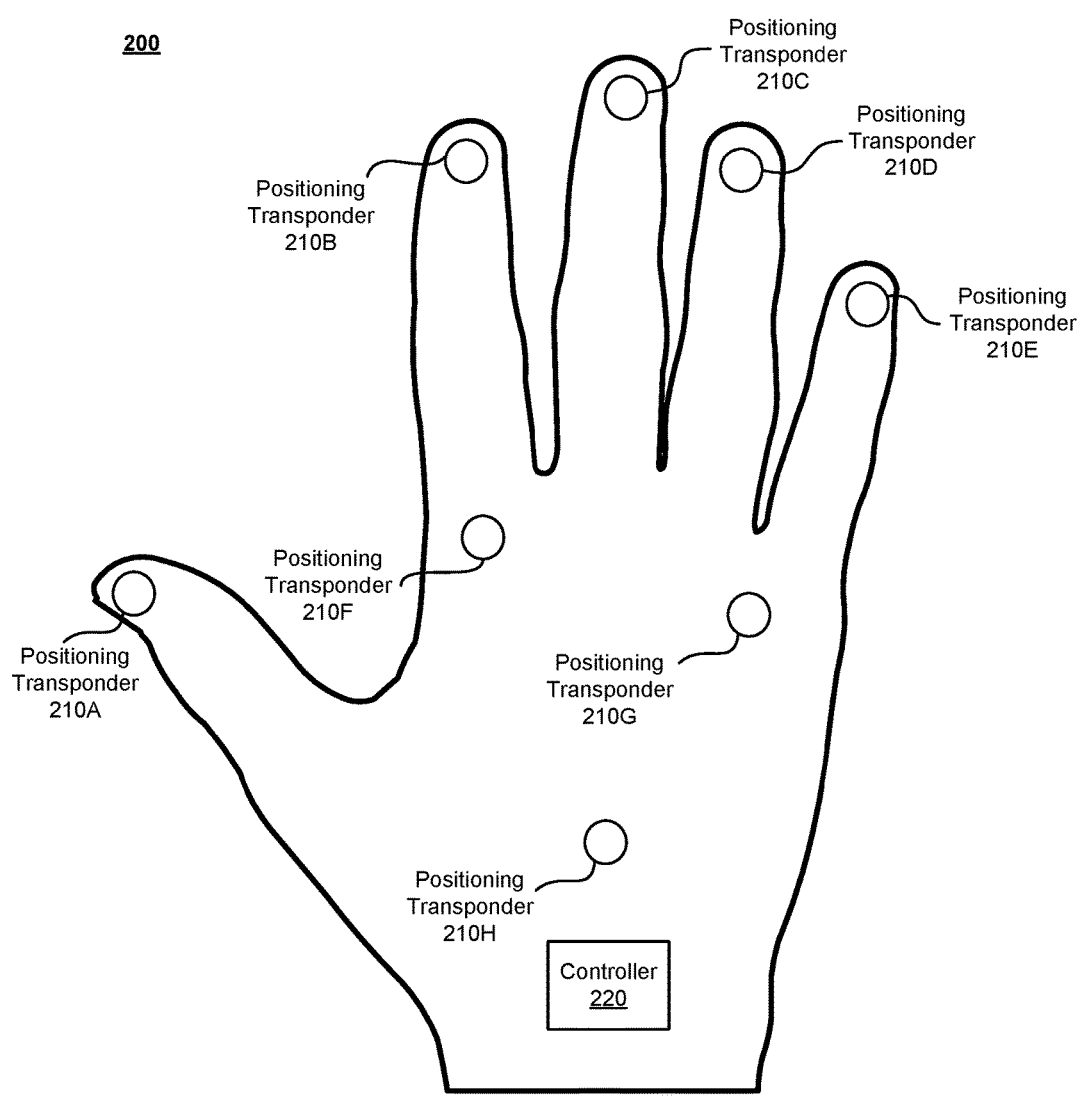
FIG. 2 illustrates a plan view of a locatable glove with positioning transponders, in accordance with an embodiment.

FIG. 2 illustrates a plan view of a locatable glove 200 (also referred to as glove 200) with positioning transponders, in accordance with an embodiment. In some embodiments, the locatable glove 200 is an embodiment of the locatable garment 140. The glove 200 includes one or more positioning transponders 210A-210H and a controller 220. In addition to being locatable, the glove 200 may provide haptic feedback, as described with respect to FIG. 1. In the embodiment of FIG. 2, the glove 200 includes a glove body that has five glove digits (one for each finger and the thumb), and each of the five glove digits has a respective positioning transponder 210A-210E near the fingertip. The glove 200 has several additional positioning transponders 210F-210H on a portion corresponding to the back of the hand. In alternate embodiments (not shown), the glove body may include some lessor number of glove digits. For example the glove body may include a glove digit for a thumb and index finger, but not other fingers. In FIG. 2, the glove 200 is shown in an orientation corresponding to posterior view of a user's right hand (i.e., a plan view of the back of the user's hand). The glove 200 may also have positioning transponders on the underside of the glove 200, corresponding to the palm of the user's hand, and one or more sides of the glove 200. Any configuration of positioning transponders on the glove 200 may be used; for example, the glove 200 may have multiple positioning transponders on each glove digit, e.g., one transponder at each bend location (e.g., located proximate to a knuckle) of a glove digit. In some embodiments, multiple antennas (e.g., multiple antennas of a single transponder) may be configured to operate together. For example, the multiple antennas may operate together to control direction of signals they emit (e.g., operate as a phased array).

When the positioning transponders 210A-210H receive an interrogation signal from an antenna, e.g., one of antennas 176, the positioning transponders 210A-210H re-radiate the received signal. In some embodiments, each positioning transponders re-radiates signals that are unique from the other positioning transponders 210A-210H, as described in more detail below, so that the interrogating device (e.g., the console 170) can distinguish the positioning transponders 210A-210H. The positioning transponders 210A-210H are configured to re-radiate signals at a particular wavelength or band of wavelengths. For example, the positioning transponders 210A-210H may re-radiate signals in the millimeter-wave band, described above, or a neighboring frequency band.

The positioning transponders 210A-210H are controlled by the controller 220. The controller 220 is in communication with the positioning transponders 210-210H, e.g., through wires integrated into the glove 200 (not shown in FIG. 2). The glove 200 may have a communication interface, such as communication interface 146 described with respect to FIG. 1, integrated into the controller 220 or in communication with the controller 220. The controller 220 may receive and process instructions, e.g., from console 170, for controlling the positioning transponders 210A-210H. The controller 220 can instruct the positioning transponders 210A-210H to re-radiate signals, and in some embodiments, controls one or more properties of the positioning transponders 210A-210H so that they re-radiate unique signals that can be individually identified by a receiving device, such as the console 170.

For example, the positioning transponders 210A-210H can be differentiated based on the time at which they are configured to re-radiate signals, the wavelength or band of wavelengths of their re-radiated signals, a code in the re-radiated signals, a combination of these characteristics, or some other signal property or combination of properties. In one example, the controller 220 instructs each positioning transponder 210A-210H to re-radiate in a given order, e.g., positioning transponder 210A, then 210B, then 210C, and so forth. Only the positioning transponder set to re-radiate at a particular time is on and able to re-radiate; the other positioning transponders are off or configured not to re-radiate interrogation signals. If a receiving device knows the order in which the positioning transponders 210A-210H are configured to re-radiate signals, the receiving device can identify the positioning transponder 210A-210H corresponding to each signal based on the time at which the signal was received. In some embodiments, the transmission times may be coordinated with a second glove, and in some cases additional gloves, so that the different gloves can be identified.

As another example, the controller 220 instructs each positioning transponder 210A-210H to re-radiate a signal with a specified wavelength or band, e.g., positioning transponder 210A at 1-1.01 mm, 210B at 1.10-1.11 mm, 210C at 1.20-1.21 mm, and so forth. To do so, each positioning transponder may shift the frequency of the interrogating signal by a different amount when it re-radiates the signal. If a receiving device knows the wavelengths or bands at which each positioning transponders 210A-210H is set to re-radiate, the receiving device can identify the positioning transponder 210A-210H corresponding to each signal based on the wavelength or band. In some embodiments, the wavelengths or bands may be coordinated with a second glove, and in some cases additional gloves, so that the different gloves can be identified.

As another example, the controller 220 instructs each positioning transponder 210A-210H to re-radiate a signal with a code (e.g., a modulated code) that can be used to identify the positioning transponder 210A-210H. The code for a positioning transponder 210A-210H can include an identification of its position on the glove 200. A receiving device programmed to interpret the code can identify the positioning transponder 210A-210H corresponding to each signal. In some embodiments, the code also provides other information about the glove 200, such as the size of the glove 200 (if gloves are available in different sizes), whether the glove 200 is a right-hand glove or left-hand glove, and an identifier of the glove 200 or a user of the glove (e.g., if multiple gloves are being tracked).

Any other technique or combination of techniques for positioning signals from multiple antennas or multiple transponders such that the transponders can be distinguished may be used. As other examples, polarization, amplitude, and/or phase state of the signals re-radiated by the positioning transponders 210A-210H may differ between the positioning transponders.

The positioning transponders 210A-210H may be divided into transmitting groups. For example, the positioning transponders 210A-210H may be divided into two groups, the first group including positioning transponders 210A-210D, and the second group including positioning transponders 210E-210H. The first group of transponders may all re-radiate signals at a first time, at four different wavelengths or bands, and the second group re-radiate signals at a second time, reusing the same four wavelengths or bands. A receiving device can then distinguish the signals based on their wavelength or bands and the time at which they are received. In particular, the receiving device may be informed that positioning transponders 210A-210D re-radiates first, followed by positioning transponders 210E-210H. Between successive sets of transmissions, controller 220 may insert a time gap between transmission by positioning transponders 210E-210H and transmission by positioning transponders 210A-210D, so that the receiving device knows that the pattern will begin again, starting with positioning transponders 210A-210D.

In some embodiments, the positioning transponders 210A-210H or subgroups of the positioning transponders 210A-210H are configured to transmit or re-radiate as one or more phased arrays. A phrased array is a set of antennas that can be electronically steered to point in a particular direction, e.g., towards a receiving device. To steer the beam, the controller 220 instructs the positioning transponders 210A-210H to re-radiate signals that have a particular phase relationship so that the re-radiated waves add together to increase the radiation in the direction of a receiving device. The controller 220 may receive feedback from the interrogating device, such as the console 170, instructing the controller 220 on the most recent orientation of the glove 220 relative to the receiving device. The controller 220 can use this information to determine a direction to steer the phased array formed by positioning transponders 210A-

210H such that it directed towards the interrogating device. In some embodiments, the glove 200 has integrated sensors, such as auxiliary sensors 144, that provide data to the controller 220 that the controller 220 can use to determine the direction to direct the phased array. The data from the auxiliary sensors 144 may include information describing the orientations and relative locations of the positioning transponders 210A-210H, or any changes to the orientations and relative locations since the most recent orientation was received from the receiving device.

In some embodiments, the controller 220 instructs one or a subset of the positioning transponders 210-210H to be operational based on conditions of the glove 200 or a particular use case. For example, based on the most recent orientation of the glove 200, only a subset of the positioning transponders 210A-210H may be useful for determining the position of the glove 200, e.g., if other positioning transponders are not within range of the interrogating device. As another example, if the location of the glove 200 within the room is used for a particular application, and not the orientation or pose of the glove 200, a single positioning transponder could be used. As a third example, if the location and/or orientation of the glove 200 are used for a particular application, but not the pose of the glove 200, a subset of the positioning transponders could be used, e.g., one transponder on the thumb and one on the pinky, or one transponder on the back of the hand and one on the palm.

Figure 3:
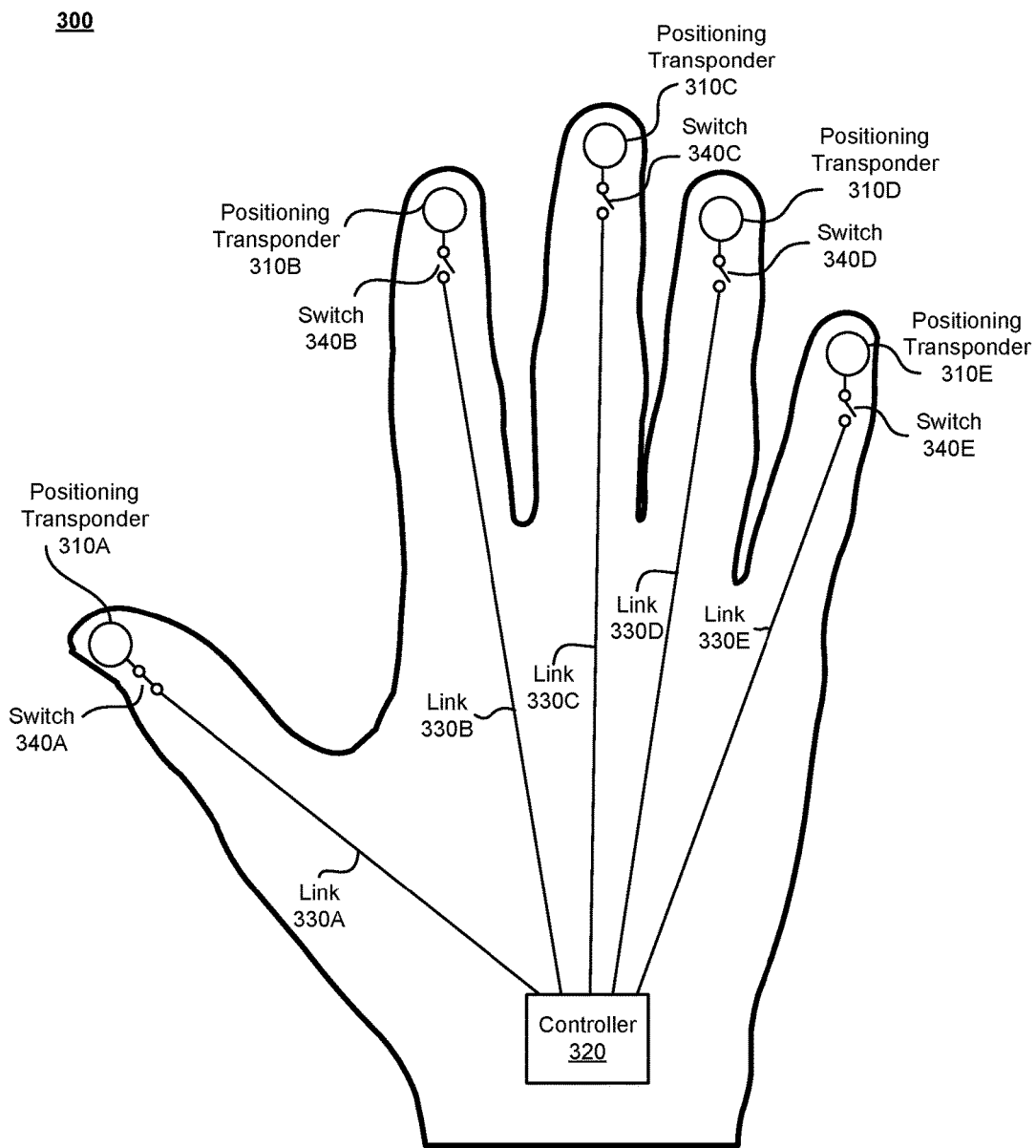
FIG. 3 illustrates a plan view of a locatable glove with positioning transponders controlled by switches, in accordance with an embodiment.

FIG. 3 illustrates a plan view of a locatable glove 300 with positioning transponders controlled by switches, in accordance with an embodiment. The glove 300 includes positioning transponders 310A-310E and a controller 320, which are similar to the positioning transponders 210A-210E and controller 220 described with respect to FIG. 2. The glove 300 also includes links 330A-330E connecting the controller 320 to respective positioning transponders 310A-310E, and switches 340A-340E for controlling the connections of the links 330A-330E to the positioning transponders 310A-310E. While the glove 300 includes only five positioning transponders 310A-310E for illustrative purposes, it should be understood that the glove 300 can include additional positioning transponders at other locations, as described with respect to FIG. 2. These additional positioning transponders can be connected to the controller 320 by links and switches.

Links 330A-330E may be wires for transmitting power to the positioning transponders 310A-310E from a power source via the controller 320. The links 330A-330E may also transmit signals from the controller 320 to the positioning transponders 310A-310E, e.g., instructions to re-radiate the received signal with a particular wavelength, code, or other characteristic. The links 330A-330E may also transmit signals from the positioning transponders 310A-310E to the controller 320, such as operational or status information. The links 330A-330E may be integrated into the glove 330 so that they are not visible to a user.

The switches 340A-340E can be operated by the controller 320 to connect and disconnect the positioning transponders 310A-310E from the links 330A-330E. In particular, if the glove 300 is configured to transmit signals from different positioning transponders 310A-310E at different points of time, the controller 320 can close a switch on a positioning transponder at a time that it should re-radiate, and open the switch on the transmitting a signal when another positioning transponder is re-radiating. As shown in FIG. 3, switch 340A, connecting link 330A to positioning transponder 310A, is closed. Thus, positioning transponder 310A is re-radiating a signal. Switches 340B-340E are open, so none of positioning transponders 310B-310E are re-radiating. As described above, in some embodiments, multiple positioning transponders re-radiate simultaneously, so the controller 320 may instruct two or more switches 340A-340E to close simultaneously.

Figure 4:
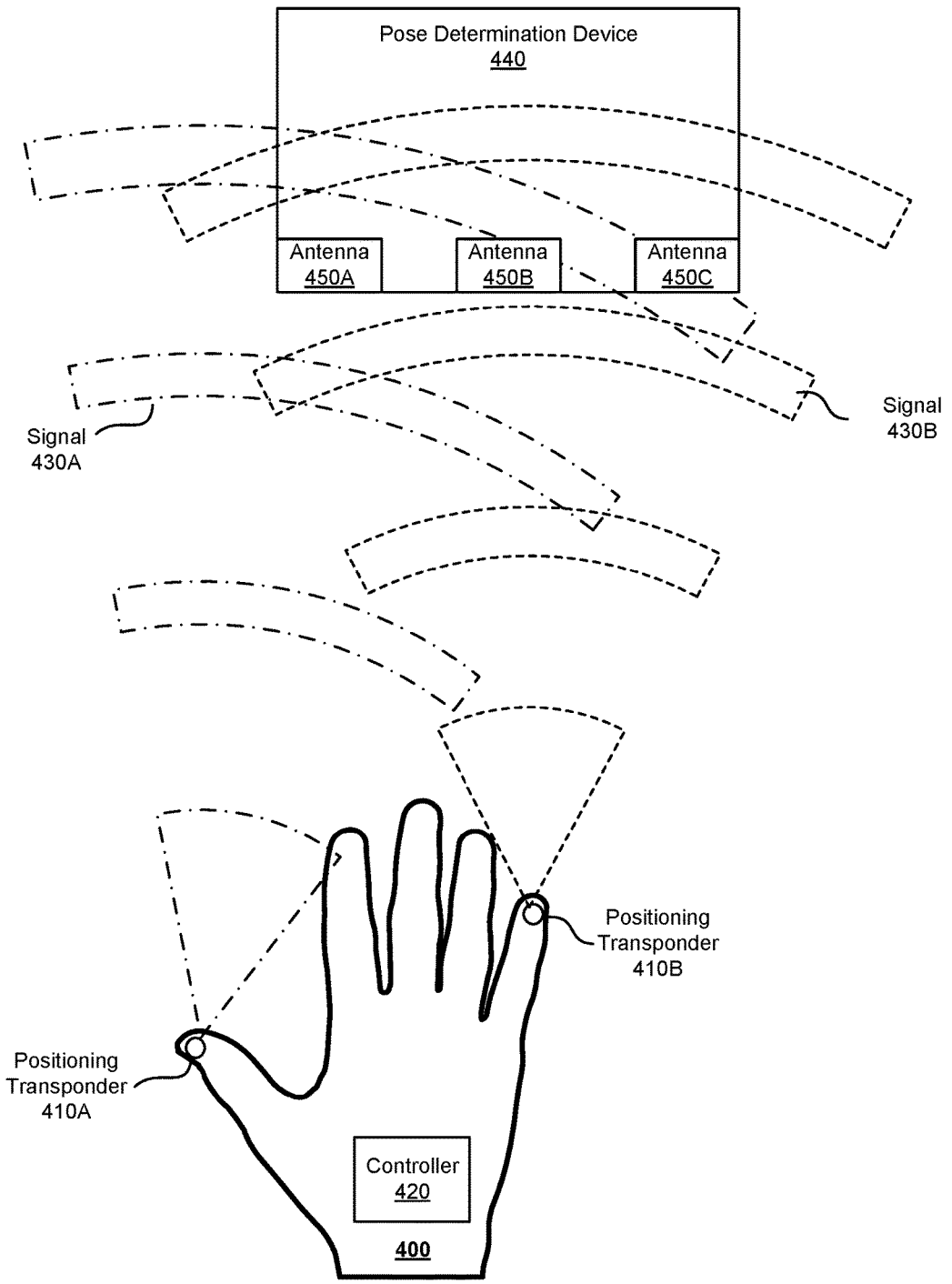
FIG. 4 shows a locatable glove with positioning transponders and a pose determination device receiving signals from the positioning transponders, in accordance with an embodiment.

FIG. 4 shows a locatable glove 400 with positioning transponders and a pose determination device 440 receiving signals from the positioning transponders, in accordance with an embodiment. The locatable glove 400 may be an embodiment of the locatable gloves 200 or 300, described with respect to FIGS. 2 and 3. For simplicity, the locatable glove 400 includes only two positioning transponders 410A and 410B. However, it should be understood that the locatable glove 400 may include additional positioning transponders. The locatable glove 400 has a controller 420, which may operate in a similar manner to controllers 220 and 320 described with respect to FIGS. 2 and 3. Moreover, it should be understood that while FIG. 4 illustrates a glove 400, in other embodiments, the positioning transponders 410A and 410B may be on some other type of wearable locatable garment.

As shown in FIG. 4, each positioning transponder 410A and 410B on the locatable glove 400 is re-radiating a respective signal 430A and 430B in the direction of the pose determination device 440. The signals 430A and 430B each have a unique characteristic or unique combinations of characteristics, as described above, so that the pose determination device 440 can distinguish signal 430A from signal 430B. The pose determination device 440 may be an embodiment of the console 170 described with respect to FIG. 1. For example, in some instances the pose determination device 440 is a HMD that includes some or all of the functionality of the console 170. The pose determination device 440 includes three antennas 450A, 450B, and 450C. One of the antennas 450A-450C transmits an interrogating signal to the locatable glove 400, which the positioning transponders 410A and 410B re-radiated as signals 430A and 430B. The antennas 450A-450C are embodiments of the antennas 176 described with respect to FIG. 1. One or more antennas 450A-450C may be located outside the pose determination device 440 and transmit data to the pose determination device 440. In some embodiments, more than three antennas 450A-450C are included, or an antenna array is used rather than three individual antennas 450A-450C.

Each antenna 450A-450C receives both signals 430A and 430B. The pose determination device 440 (e.g., the console 170 having a locatable garment pose module 178) identifies received signals that were re-radiated from the same positioning transponder. For example, each antenna 450A, 450B, and 450C receives signal 430A from positioning transponder 410A. The pose determination device 440 groups these three received signals together as one subset of received signals, and triangulates the location of positioning transponder 410A based on the three versions of signal 430A in the subset. Similarly, the pose determination device 440 groups together three versions of signal 430B received by antennas 450A, 450B, and 450C into a second subset of signals and triangulates the location of positioning transponder 410B based on this second subset.

The pose determination device 440 may compare the received signals 430A and 430B to data describing which positioning transponder 410A-410B corresponds to which unique signal characteristic(s). Thus, the pose determination device 440 can determine that signal 430A was re-radiated by a positioning transponder 410A near the tip of the thumb of the glove 400, and that signal 430B was re-radiated by a positioning transponder 410B near the tip of the pinky finger of the glove 400. In other embodiments, the pose determination device 440 does not have data indicating which signal corresponds to which antenna, but can determine how the received signals 430A and 430B correspond to different points on the glove 400 based on the relative locations of the received signals 430A and 430B.

In some embodiments, the positioning transponders 410A and 410B can be configured according to instructions from the pose determination device 440. For example, if the pose determination device 440 is in range of multiple gloves, the pose determination device 440 may instruct the glove 400 to alter its re-radiated signals so that the pose determination device 440 can distinguish the glove 400 from the other glove(s). The pose determination device 440 can generate instructions to modify an emission property of the positioning transponders 410A and 410B, e.g., so that they re-radiate at a different frequency band or different code, or different time. The controller 420 receives the request to modify the signal properties of positioning transponders 410A and 410B, and responsive to the request, the controller 420 instructs the positioning transponders 410A and 410B to re-radiate signals according the modified properties.

Figure 5:
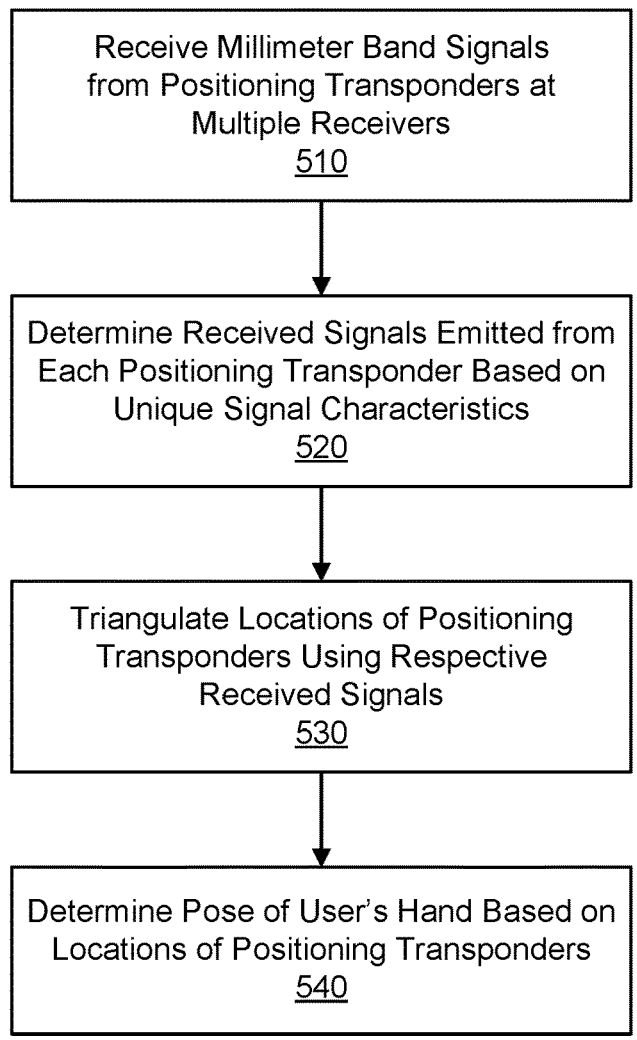
FIG. 5 is a flow chart showing a process for determining the pose of a user's hand, in accordance with an embodiment.

FIG. 5 is a flow chart showing a process 500 for determining the pose of a user's hand, in accordance with an embodiment. The process 500 may be performed by a pose determination device 440, such as a console 170 having a locatable garment pose module 178. Other entities (e.g., a HMD 110) may perform some or all of the steps in the process in other embodiments. For example, antennas receiving signals from the positioning transponders may be located on the HMD 110, or may be distributed throughout a space, including in the console 170, in the HMD 110, and/or on separate devices. A processor implementing the locatable garment pose module 178 for determining a pose may be integrated into the HMD 110, the console 170, the locatable garment 140, or any other device. Embodiments may include different and/or additional steps, or perform the steps in different orders.

Multiple receivers, such as antennas 440A-440C or antennas 176, receive 510 millimeter-wave band signals from positioning transponders on a glove. The signals may be re-radiated by positioning transponders on a glove, such as glove 200, 300, or 400 described with respect to FIGS. 2-4, or by any other locatable garment 140. The multiple receivers are distributed in space so that the location of each positioning transponder can be determined by triangulation or trilateration.

The locatable garment pose module 178 determines 520 which received signals were re-radiated from each positioning transponder based on unique signal characteristics. As described above with respect to FIG. 2, each signal transmitted by a different positioning transponder on the glove has a unique characteristic or set of characteristics, and the locatable garment pose module 178 can determine which received signals were re-radiated by the same positioning transponder, and group signals from the same positioning transponder into subsets. In some embodiments, the locatable garment pose module 178 can determine which particular glove location a received signal corresponds to, as described with respect to FIG. 4.

The locatable garment pose module 178 triangulates 530 the locations of the positioning transponders using the respective received signals for each positioning transponder. In particular, for each set of received signals received from a single positioning transponder, the locatable garment pose module 178 calculates the locations of the positioning transponder based on the received signal using known triangulation techniques.

The locatable garment pose module 178 determines 540 the pose of the user's hand based on the locations of the positioning transponder. The locatable garment pose module 178 may interpolate the full hand pose based on the determined points on the hand. For example, if the locatable garment pose module 178 references data indicating which signal corresponds to which positioning transponder, the locatable garment pose module 178 may use this data to determine the pose of the user's hand. In other embodiments, the locatable garment pose module 178 may be able to determine the pose of the user's hand without such data, based on the relative locations of the positioning transponders.

The locatable garment pose module 178 may compare the determined pose to a database of known gestures to identify a gesture made by the user. In some embodiments, the locatable garment pose module 178 may track the pose of the glove over time to identify gestures or other movements. In some embodiments, the console 170 and/or HMD 110 may provide visual feedback to the user in response to a gesture or movement, as described with respect to FIG. 1. In some embodiments, the glove provides haptic feedback to the user, as described with respect to FIG. 1.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A system comprising:
    a locatable glove comprising:
        a glove body configured to be worn over a hand of a user; and
        a plurality of positioning transponders coupled to the glove body at a corresponding plurality of positions on the glove body, each positioning transponder configured to re-radiate a received signal, the re-radiated signal unique to the positioning transponder; and
    a pose determination device comprising:
        a plurality of antennas each configured to receive the unique signals re-radiated by the plurality of positioning transponders, the antennas physically separated from each other; and
        a controller communicatively coupled to the plurality of antennas, the controller configured to determine, for each of the received unique signals, a location of the position on the locatable glove of the positioning transponder corresponding to the unique signal.

2. The system of claim 1, wherein the controller is configured to determine the location of the position on the locatable glove of the positioning transponder corresponding to the unique signal by:
    identifying a subset of the received signals corresponding to the positioning transponder based on a characteristic of the subset of received signals, each received signal in the subset received by a corresponding one of the plurality of receiving antennas; and
    triangulating the location of the positioning transponder based on the identified subset of the received signals.

3. The system of claim 1, wherein the controller is further configured to determine, based on the determined locations of the positions of the plurality of positioning transponders on the locatable glove, a position of the user's hand.

4. The system of claim 1, wherein each positioning transponder of the plurality of positioning transponders is configured to re-radiate a signal within a unique band within a millimeter-wave band.

5. The system of claim 1, wherein each positioning transponder of the plurality of positioning transponders is configured to re-radiate a signal at a unique time relative to other positioning transponders.

6. The system of claim 1, wherein each positioning transponder of the plurality of positioning transponders is configured to re-radiate a signal that is different from other signals re-radiated by other positioning transponders of the plurality of positioning transponders.

7. The system of claim 1, wherein a first positioning transponder of the plurality of positioning transponders is located proximate to a first fingertip of a first glove digit of the glove body, and a second positioning transponder of the plurality of positioning transponders is located proximate to a second fingertip of a second glove digit of the glove body.

8. The system of claim 1, wherein the pose determination device comprises at least one of a head-mounted display (HMD) and a console.

9. The system of claim 1, further comprising a second locatable glove with a second plurality of positioning transponders each configured to re-radiate a signal unique to the positioning transponder, and the controller of the pose determination device is configured to distinguish the plurality of positioning transponders on the locatable glove from the second plurality of positioning transponders on the second locatable glove.

10. A locatable glove comprising:
    a glove body configured to be worn over at least a portion of a hand of a user; and
    a plurality of transponders coupled to the glove body at a corresponding plurality of positions on the glove body, each transponder configured to re-radiate a received signal, the re-radiated signal unique to the transponder and in a millimeter-wave band; and
    a controller communicatively coupled to the plurality of transponders and configured to control emission of the plurality of transponders.

11. The locatable glove of claim 10, wherein the controller is configured to independently control emission of each transponder of the plurality of transponders such that each transponder re-radiates a signal at a unique time relative to other transponders in the plurality of transponders.

12. The locatable glove of claim 10, wherein each transponder of the plurality of transponders is configured to re-radiate a signal within a unique band within the millimeter-wave band.

13. The locatable glove of claim 10, wherein each transponder of the plurality of transponders is configured to re-radiate a signal that is different from other signals re-radiated by other transponders of the plurality of transponders.

14. The locatable glove of claim 10, wherein the controller is further configured to:
    receive a request to modify an emission property of an transponder of the plurality of transponders; and
    responsive to the request, instruct the transponder to re-radiate a signal according the modified property.

15. The locatable glove of claim 14, wherein a first transponder of the plurality of transponders is located proximate to a first fingertip of a first glove digit of the glove body, and a second transponder of the plurality of transponders is located proximate to a second fingertip of a second glove digit of the glove body.

16. A pose determination device comprising:
    a plurality of receiving antennas physically separated from each other on the pose determination device, each receiving antenna configured to receive a plurality of signals corresponding to a plurality of unique signal re-radiated by a corresponding plurality of positioning transponders on a locatable glove; and
    a controller communicatively coupled to the plurality of receiving antennas, the controller configured to:
        receive, from each receiving antenna, the plurality of signals received by the receiving antenna;

identify, for each positioning transponder of the plurality of positioning transponders, a set of received signals corresponding to the positioning transponder based on a characteristic of the signals in the set of received signals, each received signal in the set was received by a corresponding one of the plurality of receiving antennas;

determine, for each positioning transponder of the plurality of positioning transponders, a location of the position on the locatable glove of the positioning transponder; and determine, based on the locations, a position of the locatable glove.

17. The device of claim 16, wherein the controller is configured to triangulate the location of the positioning transponder based on the identified set of the received signals.

18. The device of claim 16, wherein the controller is further configured to identify, for each positioning transponder of the plurality of positioning transponders, the set of received signals corresponding to the positioning transponder based on one of a time at which the set of received signals were transmitted, a frequency of the set of received signals, and a code of the set of received signals.

19. The device of claim 16, further comprising a memory for storing data describing, for each positioning transponder of the plurality of positioning transponders, a characteristic of the signal associated with the positioning transponder and a corresponding position on the locatable glove associated with the positioning transponder.

20. The device of claim 16, wherein the controller is further configured to:

determine a second position of the locatable glove; and identify, based on the position of the locatable glove and the second position of the locatable glove, a type of motion of a hand of a user wearing the locatable glove.

* * * * *